United States Patent [19]

Zimmermann

[11] Patent Number: 4,658,973
[45] Date of Patent: Apr. 21, 1987

[54] INSULATING JUG OR BOTTLE HAVING A CLOSING MEMBER CARRYING A SEALING MEMBER

[75] Inventor: Anso Zimmermann, Bad Hersfeld, Fed. Rep. of Germany

[73] Assignee: Rotpunkt Dr. Anso Zimmermann, Niederaula, Fed. Rep. of Germany

[21] Appl. No.: 738,947

[22] Filed: May 29, 1985

[30] Foreign Application Priority Data

Sep. 11, 1984 [DE] Fed. Rep. of Germany ....... 3433354

[51] Int. Cl.⁴ ...................... A47J 41/00; B65D 47/20; B65D 51/14; B65D 81/38
[52] U.S. Cl. ............................... 215/13 R; 215/12 A; 215/307; 215/314; 215/356; 222/552
[58] Field of Search ................ 215/13 R, 12 A, 13 A, 215/307, 12 R, 314, 315, 350, 356; 222/552, 556

[56] References Cited

U.S. PATENT DOCUMENTS

| | | | |
|---|---|---|---|
| 437,232 | 9/1890 | Norton | 222/552 X |
| 2,685,379 | 8/1954 | Moeller | 215/13 R X |
| 2,946,491 | 7/1960 | Bramming | 215/13 A X |
| 3,776,433 | 12/1973 | De Treitas | 215/13 A X |
| 3,963,120 | 6/1976 | Perfect | 215/314 X |
| 4,121,730 | 10/1978 | Dammer | 215/307 X |

FOREIGN PATENT DOCUMENTS

| | | | |
|---|---|---|---|
| 2152725 | 4/1973 | Fed. Rep. of Germany . | |
| 2162843 | 6/1973 | Fed. Rep. of Germany . | |
| 2909332 | 9/1980 | Fed. Rep. of Germany | 215/13 R |

Primary Examiner—William Price
Assistant Examiner—Sue A. Weaver
Attorney, Agent, or Firm—Scully, Scott, Murphy & Presser

[57] ABSTRACT

The invention relates to an insulating jug or bottle having a housing in which a recess is arranged on the upper side which recess may be closed by means of a lid, having an opening therein, positioned in the region of the recess and which is to be closed and opened by means of a closing member carrying a sealing member, which closing member is mounted in the lid so that it may be adjusted between an opened and closed position by means of an adjusting mechanism, more particularly a worn gear or the like, having a hand grip, which mechanism acts inflexibly in the direction of the closed position, whereby movement of the hand grip is restricted in the closed position and the lid is fixed on the housing in the direction of movement of adjustment of the closing member. The object of the invention is to develop the insulating jug or bottle in such a way that when avoiding overloading of the sealing member, even when there are distance tolerances between the lid and the opening, tight closure of the opening is guaranteed. This is achieved by arranging an elastic connection (15) between the sealing member (14) and the closing slide (16), permitting relative movement between the closing member (16) and the sealing member (14) in a longitudinal direction in respect of the movement of adjustment, in which case the sealing member (14) is prestressed in the closed position towards the sealing surface (34) of the opening (9).

14 Claims, 2 Drawing Figures

INSULATING JUG OR BOTTLE HAVING A CLOSING MEMBER CARRYING A SEALING MEMBER

FIELD OF THE INVENTION

The invention relates to an insulating jug or bottle.

BRIEF DESCRIPTION OF THE PRIOR ART

For several reasons it is required that the lids of insulating jugs or bottles be firmly fixed in position. A basic reason for this consists in preventing the lid from coming undone unintentionally. This applies to both screw lids and so-called plug-in lids which are held in their inserted position by means, for example, of a snap connection or a bayonet catch. For practical reasons, the lid is fixed by positioning surfaces on the lid side against surfaces on the housing side. In the case of a screw lid, the lid is firmly fixed, for example, through the abutting action of a shoulder effected between the lid and the housing. In the case of plug-in lids, such contact surfaces are also given, for example, in the case of a bayonet catch through the bayonet catch itself It is also necessary to fix the lid in position because the lid serves as an abutment for the adjusting mechanism for the adjustment of the closing member.

Difficulties arise in practice when sealing the opening in the case of handles whose closing movement is predetermined or at least restricted, for example, by means of a marking or by means of the adjusting mechanism itself, for example, through restricted turning movement of a lever. These difficulties are occasioned by dimensional tolerances both with respect to the housing and the lid, with respect to which it is to be taken into consideration that the housing, the lid and, to a large extent also, the adjusting mechanism can be made of synthetic material. This is why the variations in dimension are conditional upon both manufacturing tolerances and distortion. If, for example, the distance between the lid and the opening turns out to be somewhat greater, closing by means of the sealing member is not guaranteed, although the handle is already in its closed position. If the aforesaid distance turns out to be somewhat smaller, overloading of the sealing member cannot be precluded because the sealing member already lies upon the edge of the opening when the handle is not yet in its closed position.

The possibility of overloading the sealing member or the sealing elements cannot be precluded basically also on account of inexpert handling by the operator when moving the handle into its closed position.

OBJECT OF THE INVENTION

The underlying object of the invention is to develop an insulating jug or bottle of the type specified in the introduction in such a way that when avoiding overloading of the sealing member, even with distance tolerances between the lid and the opening, tight closure of the opening is guaranteed.

SUMMARY OF THE INVENTION

In the case of the development according to the invention, on account of the elastic connection the sealing member automatically conforms to the differences in distance between the lid and the opening which are given on account of the dimensional tolerances and according to the size of which the length of the relative movement is to be calculated. The sealing member is thereby prestressed in its closed position towards the sealing surface of the opening in such a way that, on the one hand, the return movement of the sealing member is guaranteed and that, on the other hand, a permanent closing force is guaranteed. The closing force improves the seal of the opening and the return motion of the closing member. Overloading of the sealing elements, that is, the edge of the opening and the sealing member or an existing seal is not possible in the case of the development according to the invention because the sealing elements can only be loaded with the prestressing force acting on the sealing member.

Tolerance compensation would, of course, also be possible through a seal of high elasticity between the sealing elements, but this does not provide a lasting solution for an insulating jug or bottle because an insulating jug or bottle is used both for retaining heat and for cooling and in view of the fluctuations in temperature to be expected and the plurality of strains (opening and closing after each pouring-out action in order to avoid a temperature change) a lasting, tight closure is not guaranteed.

The invention provides for an insulating jug or bottle which incorporates developments which may be produced simply and which are therefore inexpensive and also compact and which guarantee reliable functioning.

A simple mechanism is provided herein which is not prone to trouble and which is connected simply with, for example is construct one piece with, a turning handle.

Possible overloading of the threads is avoided by means of the development because the stop faces, which are directed crosswise in respect of the direction of rotation, avoid such overloading. In addition, the stop which acts in the closed position of the sealing member prevents the sealing member and the closing member from being completely pressed together and, in this way, the sealing elements from being overloaded. The arrangement is such that the stop restricting the closing movement takes effect at the latest when the sealing member and the closing member have been completely pressed together. With regard to a marking denoting the opened and closed position of the handle, it is advantageous to limit the range of swing of the handle between its opened and closed position to a half turn.

The development according to a further feature is particularly suitable for a screw lid. This further development namely makes it possible to use the handle also for screwing in and out the screw lid. Screwing in the screw lid is possible in the closed position of the handle and screwing out is possible in the opened position of the handle. In these positions it is guaranteed that the screw lid is taken along by means of the stops acting between the closing member and the screw lid.

The constructions according to further inventive features make it possible to fix the screw lid in position by positioning the edge of the lid on the upper side of the housing in the screwing position. On account of the screw thread, suitable limitation of withdrawal turning of the screw lid is achieved so that when turning the handle between its opened and closed position the screw lid is not turned with it. This favourable action is also made possible by the stop faces which are directed crosswise in respect of the direction of rotation. Moreover, this development results in a simple and good seal of the edge of the recess. A seal of this kind is of particular importance for bulky insulating jugs (teapots), because such insulating jugs must be substantially inverted in order to pour out remaining residual fluid. In this position the fluid reaches the region of the edge of the recess and leaks out there next to the pouring portion if no seal is present.

The present invention obtains increased importance if a seal is arranged between the edge of the lid and the upper side of the housing. In such a case the screwing position of the lid can vary depending on the flexibility of the seal, whereby the distance tolerances are increased between the lid and the opening.

A hollow lid can be formed in a simple manner through another feature of the invention. Moreover, said development is advantageous for reasons of assembly and disassembly.

When sealing ring as mentioned hereinbefore is present, pursuant to another inventive feature both the seal between the lid and the housing and at the same time the seal of the dividing joint is achieved so that no fluid is able to leak into the dividing joint.

Further features according to the invention also serve to seal the gap between the closing member or the handle and the upper portion of the housing and lower portion of the housing.

An exemplary embodiment of the invention is described in greater detail in the following with the aid of a simplified drawing.

DETAILED DESCRIPTION OF THE INVENTION

Figure 1:
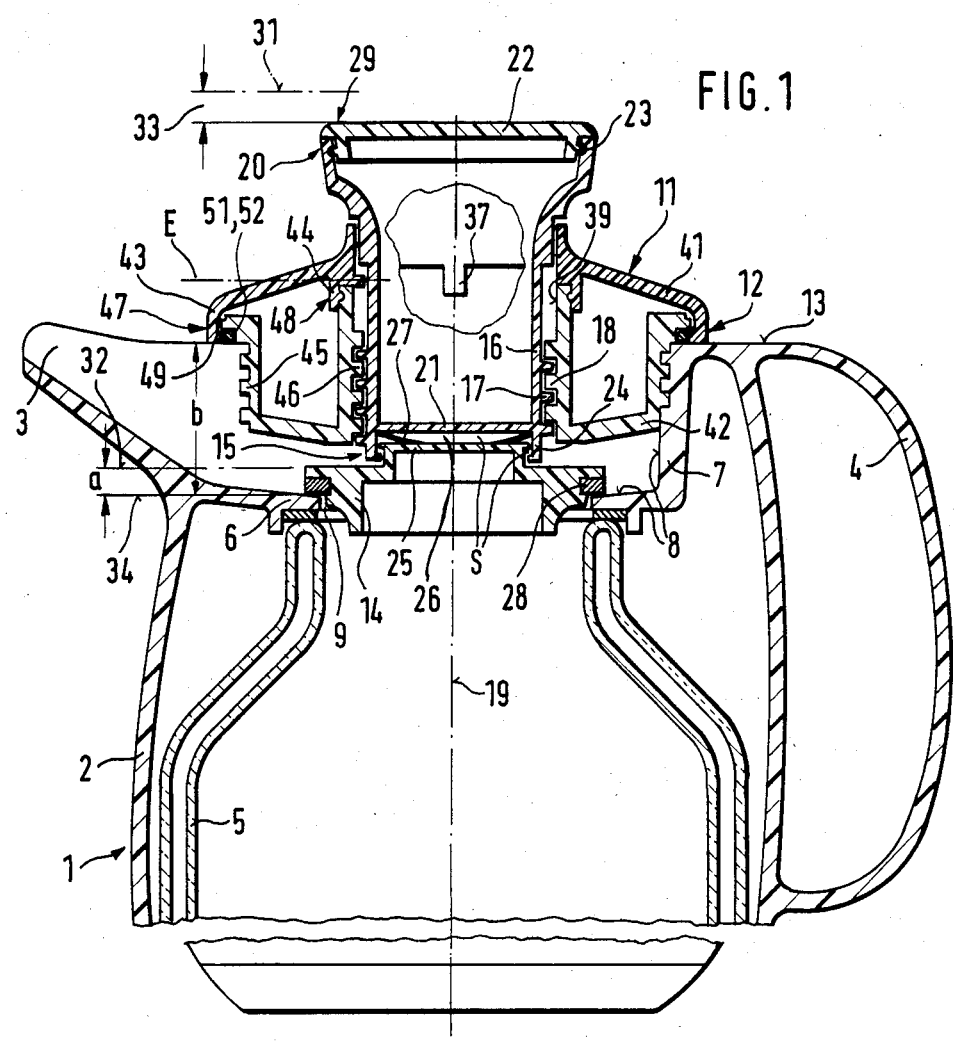
FIG. 1 shows a vertical partial section of an insulating jug developed according to the invention.
Figure 2:
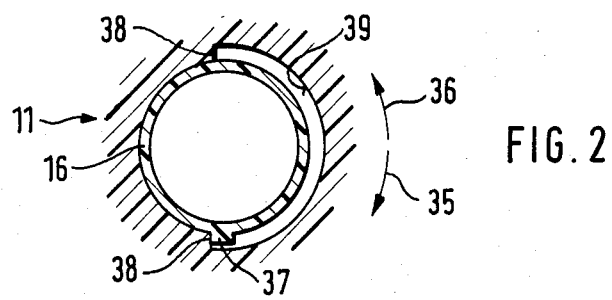
FIG. 2 shows a horizontal partial section through the lid of the insulating jug at the height of plane E.

The insulating jug which is generally denoted with 1 has a housing 2 which is made of synthetic material and onto which a pouring portion 3 and a grip 4 are preformed in one piece. The housing 2 encloses an insulating container 5, the edge of the opening of which is tightly tensioned, in a manner not represented, against a shoulder 6 of a head piece 7 of the housing 8. The head piece 7 surrounds a recess 8 on the upper side, in which recess there is arranged an opening 9 arranged coaxially with the opening of the insulating container 5. The pouring portion 3 is laterally connected to the recess 8. A screw lid which is generally designated 11 and which in the screwed-in position lies with an edge 12 tightly upon the upper side 13 of the housing 2, may be screwed into the recess 8 from above.

The present exemplary embodiment is a teapot, that is, the insulating container 5 bulges out a comparatively long way and the housing 2 is compact whilst conforming to the usual shape of a teapot. That is why in order to pour out the fluid remaining in the insulating jug 1, it is necessary to turn the latter substantially upside-down so that the residual fluid is able to flow out.

The opening 9 can be closed and opened selectively by means of a sealing member 14 which is connected by means of an elastic connection 15 with a closing member 16 which has an external screw thread 17 with which it may be vertically adjusted in an internal screw thread 18 in the lid 11 by rotation about a vertical axis of rotation 19 which, at the same time, is the centre axis of the insulating jug. The closing member 16 is completely set through the lid 11 and is formed outwards in one piece above the lid 11 to form a turning hand grip 20 for the purposes of a turning knob. In order to save weight, the closing member 16 and the turning hand grip 20 are constructed so that they are hollow. Both portions are formed by means of a substantially cylindrical pot, the bottom of which is denoted with 21 and which may be closed at the top by means of a closing plate 22 which is fixed on the pot by means of a snap fixing 23.

The elastic connection 15 is formed by means of a collar 24, which is undercut on the inside, on the lower side of the closing member 16 in which a projection 25 on the upper side of the sealing member 14 is guided so that it moves in a vertically restricted manner. The clearance for movement is denoted with S. The projection 25 engages with one edge into the undercut of the collar 24. In this way, the pushing-out movement of the sealing member 14 in respect of the closing member 16 is restricted. A cup spring 27, which forces the closing member 16 and the sealing member 14 apart and which thus prestresses the sealing member 14 in the direction of the opening 9, is arranged between the sealing member 14 and the closing member 16 in the cavity 26 enclosed by the collar 24. On account of the round cross-sectional shape at least in the region of the elastic connection 15, the sealing member 14 and the closing member 16 may be turned about the axis of rotation 19 relative to each other.

According to FIG. 1, the sealing member 14 is found in its closed position in which it lies with an annular seal 28 on the edge of the opening 9 to form a seal. On account of the tension of the cup spring 27 a certain closing force, which can be predetermined, exists. It would also be possible to utilize just the dead weight of the sealing member 14 as a closing force instead of another tension, but a spring force is advantageous for the purpose of restoring the sealing member 14 in a reliable manner. Like the sealing member 14, the turning hand grip 20 is also in its closed position, that is, a marking, preferably provided on its upper side at 29, is located on the side of the pouring portion 3.

The opened positions of the sealing member 14 and the turning handle 20 are indicated by dot-dash lines and denoted with 31, 32. The measure of displacement 33 is achieved by a half turn of the turning handle 20. The arrangement is such that the distance a of the opened position 32 of the sealing member 14 from the opening 9 is somewhat smaller than the measure of displacement 33 of the turning handle 20 or the closing member 16. Consequently, the sealing member 14 touches down upon the edge of the opening 9 before the turning handle 20 has reached its closed position. When the turning handle 20 is turned further into the closed position, the projection 25 of the sealing member 14 dips into the cavity 26 of the elastic connection, in which case the closure is guaranteed through the sealing member 14 which lies upon the edge of the opening 9. Furthermore, the arrangement is such that, in the closed position represented, the projection 25 is substantially in the centre of the clearance for motion S. Through this development or arrangement, distances b, which vary on account of dimensional tolerances, between the upper side 13 of the housing 2 or the lower side of the edge 12 on the lid and the sealing surfaces 34 on the edge of the opening 9 and on the annular seal 28 are automatically compensated. That is why the sealing member 14 in its closed position is always found in the free clearance area of the elastic connection 15.

The closing movement 35 and the opening movement 36 of the turning hand grip 20 is restricted by stops which are formed by a lateral lug 37 on the closing member 16 and two projections 38 which are arranged on the wall of the passageway 39 in the lid 11 receiving the closing member 16.

As the lug 37 stops against the projections 38, the lid 11 can be both unscrewed and screwed down by means of the turning handle 20.

The arrangement is then such that when the lug 37 lies on the projection 38 assigned to the closed position and when the lid 11 is fully screwed in, the projection 25 is substantially in the centre of the clearance for motion S present.

The lid 11 is constructed so that it is hollow and consists of a dish-shaped lid upper portion 41 and a dish-shaped lid lower portion 42, which are snapped onto each other and have walls 43 to 46, of which the wall 45 of the lower portion 42 of the lid has the external screw thread of the lid 11 and the wall 46 of the lower portion 42 of the lid has the internal screw thread 18 for the closing member 16. The walls 43, 44 of the upper portion 41 of the lid overlap the walls 45, 46 of the lower portion 42 of the lid and are snapped onto these at 47 and 48. The wall 43 is thereby drawn downwards as far as the lower side of the edge 12. An annular groove 51, in which an elastic sealing ring 52 is set which in the relaxed state projects over the lower side of the edge 12, is located in the region of the dividing joint designated 49. If the edge 12 is screwed towards the upper side 13 of the housing 2, the sealing ring 52 is compressed, simultaneously sealing the dividing joint 49 and the joint between the lower side of the edge 12 and the upper side 13.

With the exception of the cup spring 27 which is made of spring steel, all the other parts of the lid 11 are made of synthetic material.

What is claimed is:

1. An insulating jug or bottle having a sealing surface surrounding an opening; a housing for said bottle having a recess formed in the upper side thereof, a lid having an opening therein for closing said recess, said lid opening being located in the region of the recess; a closing member mounted on the lid for closing the opening in the lid; a sealing member on said closing member, an adjusting mechanism comprising a worm gear for adjusting said closing member between a raised and lowered positioned relative to the housing; said closing member including a hand grip for raising and lowering said closing member; and stopping means for restricting movement of the hand grio in the closed position and for fixing the lid on the housing in the direction of movement of adjustment of the closing member, the improvement in that an elastic connection is arranged between the sealing member and the closing member facilitating relative movement with limited clearance therebetween in a longitudinal direction relative to the movement of adjustment, whereby the sealing member is prestressed in the closed position towards said sealing surface on the bottle opening.

2. An insulating jug or bottle according to claim 1, characterized in that the sealing member is mounted telescopically in the closing member; and said elastic connection includes a spring being arranged between the sealing member and the closing member for the prestressing of said sealing member.

3. An insulating jug or bottle having a sealing surface surrounding an opening; a housing for said bottle having a recess formed in the upper side thereof, a lid having an opening therein for closing said recess, said lid opening being located in the region of the recess; a closing member mounted on the lid for closing the opening in the lid; a sealing member on said closing member; an adjusting mechanism comprising a worm gear for adjusting said closing member between a raised and lowered position relative to the housing; said closing member including a hand grip on said adjusting mechanism for rigidly biasing said mechanism in the direction of the closed position for raising and lowering said closing member; and stopping means for restricting movement of the hand grip in the closed position and for fixing the lid on the housing in the direction of movement of adjustment of the closing member, the improvement in that an elastic connection is arranged between the sealing member and the closing member facilitating relative movement with limited clearance therebetween in a longitudinal direction relative to the movement of adjustment, the sealing member being prestressed in the closed position towards said sealing surface on the bottle opening, the sealing member being mounted telescopically in the closing member; and said elastic connection including a spring being arranged between the sealing member and the closing member for the prestressing of said sealing member.

4. An insulating jug or bottle according to claim 1 or 3, characterized in that the spring is a cup spring which is arranged in a cavity located between the telescopic portions of the sealing member and closing member.

5. An insulating jug or bottle according to claim 1 or 3, characterized in that the worm gear includes a threaded portion on said closing member with an external screw thread screwed into an internal screw thread of the lid and which is connected with said hand grip.

6. An insulating jug or bottle according to claim 5, characterized in that the closing member extends through the upper side of the lid and is integrally connected with said hand grip.

7. An insulating jug or bottle according to claim 6, characterized in that said stopping means include stop faces extending transversely of the direction of rotation of the hand grip to restrict the opening and closing movement of the closing member, said stop faces being located on the closing member and the lid, respectively.

8. An insulating jug or bottle according to claim 7, characterized in that the angle of rotation of the hand grip is limited to approximately half a turn by the stop faces.

9. An insulating jug or bottle according to claim 8, characterised in that the includes external threads.

10. An insulating jug or bottle according to claim 1 or 3, characterized in that the lid has an edge contacting the upper side of the housing and includes means to form a seal therebetween.

11. An insulating jug or bottle according to claim 10, characterized in that said seal forming means is a sealing ring arranged in an annular groove between the lower side of the edge and the upper side of the housing.

12. An insulating jug or bottle according to claim 11, characterized in that the lid is hollow and formed by means of a lid upper portion and a lid lower portion which are provided with means snappable to each other to permit a snap fit between said portions.

13. An insulating jug or bottle according to claim 12, characterized in that a juncture is defined between the upper portion of the lid and the lower portion of the lid, and an annular groove is arranged in the region of the juncture.

14. An insulating jug or bottle according to claim 12, characterized in that the upper portion of the lid and the lower portion of the lid sealingly encloses the closing member and the hand grip by at least one sealing ring and at least one guide surface.

* * * * *